Patented Jan. 27, 1953

2,626,937

UNITED STATES PATENT OFFICE 2,626,937

OXYPROPYLATED ALLYL STARCH

Melvin De Groote, University City, Mo., assignor to Petrolite Corporation, a corporation of Delaware No Drawing. Application May 14, 1951, Serial No. 226,323

1 Claim. (Cl. 260—17.4)

The present invention is concerned with certain new chemical products, compounds, or compositions which have useful application in various arts. It includes methods or procedures for manufacturing said new chemical products, compounds, or compositions, as well as the products, compounds, or compositions themselves.

Complementary to the above aspect of the invention herein disclosed is my companion invention concerned with the use of these particular chemical compounds, or products, as demulsifying agents in processes or procedures particularly adapted for preventing, breaking, or resolving emulsions of the water-in-oil type, and particularly petroleum emulsions. See my co-pending application, Serial No. 226, 322, filed May 14, 1951.

The present invention is concerned with oxypropylated starch or comparable derivatives derived from polymerized allyl starch. More specifically, the invention is concerned with hydrophile synthetic products; said hydrophile synthetic products being obtained by the oxypropylation of a member selected from the class consisting of organic solvent-soluble allyl starch and polymerized allyl starch; said oxypropylation involving 5 to 50 parts by weight of propylene oxide per unit weight of the allyl starch derivative.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application, Serial No. 226,322, filed May 14, 1951.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as for example, for cosmetics, spray oils, water-repellent textile finishes; as lubricants, etc.

For convenience, what is said hereinafter will be divided into three parts:

Part 1 will be concerned with a brief description of allyl starch and polymerized allyl starch;

Part 2 will be concerned with the oxypropylation of allyl starch and polymerized allyl starch; and Part 3 will be concerned with derivatives valuable for various purposes including demulsification but not specifically claimed in the instant application.

PART 1

Allyl starch is the name commonly applied to the allyl ether of starch. Allyl ethers of starch are well known and have been described in the literature. See the article entitled "Allyl Ether of Starch, Preparation and Industrial Possibilities," by Nichols, Jr., Hamilton, Smith, and Yanovsky. (Industrial and Engineering Chemistry, volume 37, No. 2, February, 1945, page 201.)

At least one company, General Mills, Inc., Minneapolis, Minnesota, produces allyl starch commercially. For a complete description of allyl starch see General Mills, Inc., New Product Data Sheet, Revision "I," December 15, 1949.

The number of allyl groups introduced per glucose unit vary somewhat but on the average probably 2.5 allyl groups per glucose unit is high. In the manufacture of allyl starch the glucose can be purified by dissolving in acetone, filtering off the small amount of unchanged or lowly substituted starch and precipitating with water. Allyl starches, as one would suspect, are readily soluble in semi-polar or oxygenated solvents such as the alcohols, dipropyleneglycol, ketones, ether alcohols, ester alcohols, etc., and particularly in the nonoxygenated or nonhydroxylated compounds if a small amount of isolbutanol is added. They are also generally soluble in all halogenated compounds except carbontetrachloride; for instance, one can usually dissolve 2 grams of allyl starch in 20 grams of suitable solvent without any difficulty. This is true in regard to benzene. For convenience, the allyl starches employed are referred to as organic solvent-soluble allyl starches or as water-insoluble allyl starches.

The manufacturer of commercially available allyl starch states as follows:

"Allyl starch is soluble in alcohols, ketones, esters, halogenated hydrocarbons, nitroparaffins, ethers, glycols (in some instances the addition of small amounts of butyl Cellosolve or butanol is required to provide good solubility), and in aromatic hydrocarbons provided some hydrogen bond forming solvent such as isobutanol is present. It is insoluble in aliphatic hydrocarbons and turpentine."

Commercial use of allyl starch is largely in the field of coatings or similar materials, such as bronzing liquids, thermosetting adhesives, overprint and finishing varnish, printing ink vehicles, and the like. In numerous instances the industrial application depends upon the ease with which allyl starch polymerizes. This fact has been noted in the literature as, for example, in the article previously cited. This allyl ether of starch insolubilizes with greater ease than the comparatively easier oxidizable allyl ethers of simpler carbohydrates.

Indeed, the manufacturer of commercial allyl starch states as follows:

"*Solution stability.*—Once allyl starch is dissolved in a solvent it is protected from air and the solutions may be stored for indefinite periods without danger of gelation. Solutions containing driers may also be stored, provided the container is kept filled in order to displace air."

In other words the solution of allyl starch oxidizes readily by mere exposure to air in the presence or absence of a catalyst. In the absence of a catalyst polymerization takes place by simply blowing in the manner, for example, that castor oil is blown at 100° C. or somewhat higher. At a lower temperature polymerization takes place if one blows in presence of .05% of cobalt (based on the weight of solids) and in the form of cobalt octoate or cobalt naphthenate. This is described in the previously mentioned New Product Data Sheet of General Mills, Inc. In any event one may prepare any suitable solution of the water-insoluble allyl starch, subject the same to blowing with air at a comparatively low temperature in presence of a catalyst as mentioned, and stop the blowing at a stage short of gelation and thus have a solution of polymerized allyl starch rather than allyl starch. As far as oxypropylation is concerned, as hereinafter described it is immaterial whether one uses allyl starch or polymerized allyl starch. In either event the allyl starches must be water-insoluble and organic solvent-soluble. It goes without saying it is more convenient if the organic solvent is one which does not interfere with subsequent oxypropylation. All of this, as far as suitable solutions are concerned, will be illustrated by subsequent examples.

*Preparation of allyl starch solution*

Allyl starch was obtained from General Mills, Inc., Minneapolis, Minnesota, as a solid which is stored and shipped under water. Solids can also be isolated from the 40% solution which is normally sold. The water was drained from the solid material and the powder immersed in a mixture of diphenyl ether and xylene. The mass was heated under reflux condenser with a phase-separating trap and water eliminated in the usual manner, along with xylene. When the water was completely eliminated and part of the xylene removed the final product consisted of 8.5 parts of allyl starch and 13 parts of solvent. The 13 parts of solvent represented 27% of diphenyl ether and 73% xylene. Any other suitable solvent could be used just as satisfactorily.

PART 2

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

Although the word "glycol" or "diol" is usually applied to compounds containing carbon, hydrogen, and oxygen only, yet the nitrogen-containing compounds herein are diols in the sense that they are dihydroxylated. Thus, the conditions which apply to the oxypropylation of certain glycols also apply in this instance.

Since low pressure-low temperature-low-reaction-speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (*a*) a solenoid controlled valve which shuts off the propylene oxide in event that the temperature gets outside a predetermined and set range, for instance, 95° to 120° C., and (*b*) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclave, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C.

Numerous reactions were conducted in which the time varied from one day to two days for completion of the final series. In some instances the reaction took place in considerably less time; for instance, at a single stage the reaction may have been complete in 5, 6 or 7 hours. In the series employed for purpose of illustration subsequently, the minimum period of time was 6 hours and the maximum 8 hours. Actually, where an oxypropylation is indicated as being complete in 6 hours it may have been complete in a considerably shorter period of time in light of the automatic equipment employed. This applies, also, to other periods of reaction, for instance, longer or shorter. The automatic devices continue stirring for the predetermined period of time even though reaction may have been complete earlier. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4 or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counerbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc. should not be conducted except in equipment specifically designed for the purpose.

Example 1a

The starting material was a mixture of allyl starch and solvent as previously described. More specifically, the mixture consisted of 8.5 pounds of allyl starch of a commercial grade, 3.5 pounds of diphenyl ether, and 9.5 pounds of xylene. The particular autoclave employed was one with a capacity of about 15 gallons, or on the average of about 125 pounds of the reaction mass. The initial charge was as previously indicated, and including one pound of caustic soda. The reaction pot was flushed out with nitrogen, the autoclave sealed, and the automatic devices adjusted for injecting 43.75 pounds of propylene oxide in approximately a 6-hour period. The oxide was added at the rate of about 9 or 10 pounds per hour. The pressure regulator was set for a maximum of 15 to 20 pounds per square inch. In other similar experiments I have used a somewhat higher pressure, for instance, a maximum pressure of 35 to 37 pounds per square inch. However, in this particular instance the pressure did not actually reach a maximum of over 20 pounds per square inch. I have found no difficulty in conducting this reaction under conditions as described at this comparatively low pressure. The temperature employed was 250–260° F.

The conditions as far as temperature and pressure were concerned are identical in the three subsequent examples, to wit, in Examples 2a, 3a and 4a.

It may be well to point out that the comparatively low pressure was due to the fact, in part at least, that there was a sizeable concentration of catalyst in all four stages of oxypropylation.

The rate of addition of propylene oxide as above indicated was comparatively slow. The initial introduction of propylene oxide was not started until the heating devices had raised the temperature well above the boiling point of water, for instance, about 240° F. At the completion of the reaction a sample was taken and oxypropylation proceeded as in Example 2a, immediately following.

Example 2a 57.75 pounds of the reaction mass identified as Example 1a, preceding, and equivalent to 7.4 pounds of allyl starch, 38.2 pounds of propylene oxide, .85 pound of caustic soda, and 11.3 pounds of solvent, were subjected to further oxypropylation without the addition of any more catalyst, in the same manner as described in Example 1a, preceding.

The amount of oxide added was 42.75 pounds. The time of addition was 7 hours. The rate of addition was about 6 or 7 pounds per hour. At the end of the reaction period part of the reaction mass was withdrawn and the remainder subjected to further oxypropylation as described in Example 3a, immediately following.

Example 3a 62.75 pounds of reaction mass identified as Example 2a, preceding, and equivalent to 4.62 pounds of allyl starch, 50.55 pounds of propylene oxide, .53 pound of caustic soda, and 7.05 pounds of solvent, were subjected to further oxypropylation without the addition of any more catalyst in the same manner as employed in Examples 1a and 2a, preceding. The amount of oxide added was 44.25 pounds. The time required to add the oxide was 8 hours. The oxide was added at the rate of about 6 pounds per hour. At the end of the reaction period part of the reaction mass was withdrawn and the remainder subjected to further oxypropylation in the manner described in Example 4a, following.

Example 4a 61.75 pounds of the reaction mass identified as Example 3a, preceding, were subjected to further oxypropylation without the addition of any more catalyst, following the same procedure as noted in Examples 1a through 3a, preceding. The amount of oxide added was 21.05 pounds. The oxide was added in 7¾ hours. The rate was about 3½ pounds per hour. The procedure as far as oxypropylation was concerned was the same as in preceding examples.

What has been said herein is presented in tabular form in Table 1 immediately following, with some added information as to molecular weight and as to solubility of the reaction product in water, xylene, and kerosene.

of acetyl or hydroxyl value. Actually, there is no completely satisfactory method for determin-

TABLE 1

| Ex. No. | Composition Before | | | | Composition at End | | | | | M. W. by Hyd. Determin. | Max. Temp., °F. | Max. pres., lbs. sq. in. | Time, hrs. |
|---|---|---|---|---|---|---|---|---|---|---|---|---|---|
| | H. C. Amt., lbs. | Oxide Amt., lbs. | Catalyst, lbs. | Solvent Amt., lbs. | Theo. Mol. Wt. | H. C. Amt., lbs. | Oxide Amt., lbs. | Catalyst, lbs. | Solvent Amt., lbs. | | | | |
| 1a | 8.50 | | 1.0 | 13.0 | 1,240 | 8.50 | 43.75 | 1.0 | 13.0 | 1,098 | 250-360 | 15-20 | 6 |
| 2a | 7.40 | 38.2 | .85 | 11.3 | 2,545 | 7.40 | 80.95 | .85 | 11.3 | 1,506 | 250-260 | 15-20 | 7 |
| 3a | 4.62 | 50.55 | .53 | 7.05 | 4,790 | 4.62 | 94.80 | .53 | 7.05 | 2,343 | 250-260 | 15-20 | 8 |
| 4a | 2.66 | 54.72 | .31 | 4.06 | 6,540 | 2.66 | 75.77 | .31 | 4.06 | 2,805 | 250-260 | 15-20 | 7¾ |

Example 1a was emulsifiable in water, insoluble in xylene, and insoluble in kerosene; Example 2a was emulsifiable in water, soluble in xylene but insoluble in kerosene; Example 3a was emulsifiable to insoluble in water, soluble in xylene, and dispersible in kerosene; and Example 4a was emulsifiable to insoluble in water, soluble in xylene and also in kerosene.

In the above table the molecular weight figures are, of course, open to speculation. Since the molecular weight of allyl starch itself is unknown the nearest approach to a molecular weight relationship depends on the glucose unit as a basis of comparison. Needless to say, the allyl ethers represent a somewhat greater molecular weight than the corresponding glucose unit. For purpose of the preceding table I have used a figure for the unit of 222. As is pointed out elsewhere, oxypropylation is a rather complicated procedure, particularly when polyhydric materials are employed, especially in such instances where more than 2 hydroxyls are available per unit or per molecule. In any event, it is to be noted that the initial allyl starch was combined with 25 to 50 times its weight of propylene oxide, based on the assumption of completeness of reaction.

In other series I have added more catalyst and continued to oxypropylate until the molecular weight range was approximately twice that, i. e., a theoretical molecular weight range of 10,000 to 12,000 where the allyl starch represented approximately 1% or slightly more of the final reaction mass. In such instances, however, the hydroxyl molecular weight rose somewhat less, to a maximum of 4,000 to 4,500.

These products were invariably kerosene-soluble as well as being xylene-soluble and insoluble in water.

The final product at the end of the oxypropylation step was amber or pale amber, or of a pale straw color in some instances. This was more or less characteristic of all the various oxypropylations products in the various stages. These products were, of course, slightly alkaline due to the residual caustic soda and also due to the basic nitrogen atom. The residual basicity due to the catalyst, of course, would be the same if sodium methylate had been used.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these type of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range.

PART 3

The product obtained as a result of the oxypropylation step has residual hydroxyl radicals.

In my co-pending applications, Serial Nos. 226,324, and 226,325, both filed May 14, 1951, I have described the fractional acidic esters obtained from oxypropylated allyl starch and polymerized allyl starch by reaction with polycarboxy acids, such as phthalic anhydride, diglycolic acid, etc. Furthermore, I have pointed out that such acidic fractional esters are suitable for demulsification of oil field emulsions or any emulsions of the water-in-oil type in the same manner as herein described in regard to oxypropylated allyl starch or polymerized allyl starch.

As indicated above, the final product obtained as described in my two co-pending applications, Serial Nos. 226,324, and 226,325, filed May 14, 1951, is a fractional ester having free carboxyl radicals. Such product, in turn, can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as ocetyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsions.

Needless to say, the oxypropylated materials, without being converted into fractional esters, can be subjected to various reactions, such as combination with other alkylene oxides such as ethylene oxide, glycide, butylene oxide, epichlorohydrin; and the like. Such hydroxylated products may be reacted with ethylene imine or various alkylene imines. The reaction product obtained by combination with epichlorohydrin may be reacted with tertiary amines to give quaternary compounds. Similarly, the hydroxylated materials may be esterified with chloroacetic acid or the like, and subsequently combined with tertiary amines to give quaternary ammonium compounds. These various materials so obtained are useful for resolution of petroleum emulsions of the kind herein referred to, particularly emulsions of the water-in-oil type. Such materials can be used also in other artcs where surface-active materials are of value.

Having thus described my invention what I claim as new and desire to secure by Letters Patent, is:

A hydrophile synthetic product which is a polyhydroxy compound selected from the class consisting of oxypropylated, organic solvent-soluble, allyl starch and oxypropylated polymerized allyl starch; said polyhydroxy compound containing in combination, 5 to 50 parts by weight of propylene oxide per unit weight of the allyl starch derivative.

his
    MELVIN × DE GROOTE.
        mark

Witnesses to mark:
 W. C. ADAMS.
 I. S. DE GROOTE.

REFERENCES CITED

The following references are of record in the file of this patent:

UNITED STATES PATENTS

| Number | Name | Date |
|---|---|---|
| 1,863,208 | Schorger | June 14, 1932 |
| 2,450,079 | Brown | Sept. 28, 1948 |
| 2,509,926 | Johnston | May 30, 1950 |
| 2,516,632 | Kesler et al. | July 25, 1950 |
| 2,541,142 | Zief et al. | Feb. 13, 1951 |